(12) United States Patent
Hirose et al.

(10) Patent No.: US 7,972,985 B2
(45) Date of Patent: Jul. 5, 2011

(54) NONWOVEN FABRIC AND PROCESS OF PRODUCING THE SAME

(75) Inventors: Yuichi Hirose, Tochigi (JP); Shinsuke Nagahara, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 11/500,452

(22) Filed: Aug. 8, 2006

(65) Prior Publication Data

US 2007/0036943 A1   Feb. 15, 2007

(30) Foreign Application Priority Data

Aug. 9, 2005   (JP) ................................ 2005-230510
Jul. 28, 2006   (JP) ................................ 2006-205828

(51) Int. Cl.
*D04H 5/04* (2006.01)
(52) U.S. Cl. ......... 442/352; 428/138; 442/327; 442/402
(58) Field of Classification Search .................. 442/327, 442/352, 402; 428/138
See application file for complete search history.

(56) References Cited

U.S. PATENT DOCUMENTS

| | | | |
|---|---|---|---|
| 3,120,733 A * | 2/1964 | Breen | ................................. 87/3 |
| 3,546,056 A | 12/1970 | Thomas | |
| 2002/0010448 A1 * | 1/2002 | Yoshimasa | .................... 604/378 |
| 2002/0068150 A1 | 6/2002 | Taneichi et al. | |
| 2003/0162460 A1 * | 8/2003 | Saka et al. | .................... 442/394 |
| 2003/0167044 A1 * | 9/2003 | Toyoshima et al. | ........... 604/367 |

FOREIGN PATENT DOCUMENTS

| | | |
|---|---|---|
| CN | 1441102 A | 9/2003 |
| EP | 0 703 308 A1 | 3/1996 |
| EP | 1 209271 A1 | 5/2002 |
| JP | 2002-187228 A | 7/2002 |
| JP | 2004-33236 A | 2/2004 |

OTHER PUBLICATIONS

Office Action issued in corresponding Chinese Patent Application No. 200610114854.8 issued Jan. 8, 2010.
Official Communication dated Nov. 26, 2010, for European Patent Application No. 06016462.1.

* cited by examiner

*Primary Examiner* — Andrew T Piziali
*Assistant Examiner* — Peter Y Choi
(74) *Attorney, Agent, or Firm* — Birch, Stewart, Kolasch & Birch, LLP.

(57) ABSTRACT

A nonwoven fabric 10 has a first layer 1 containing crimped fibers 11. In the layer 1, the crimped fibers gather in parts to form a large number of fiber clusters 12 that are distributed all over the layer 1. The clusters 12 interconnect to each other to form a network structure in the layer 1. The nonwoven fabric 10 further has another fiber layer as a second layer 2 disposed on a side of the first layer 1. The two layers are partly joined at a large number of joints 3. The second layer 2 protrudes outwardly between the joints 3 to form a large number of protrusions 20.

6 Claims, 3 Drawing Sheets

NONWOVEN FABRIC AND PROCESS OF PRODUCING THE SAME

FIELD OF THE INVENTION

The present invention relates to nonwoven fabric containing crimped fibers.

BACKGROUND OF THE INVENTION

Nonwoven fabric containing crimped fibers is known. Nonwoven fabric of this type is used as, for example, a topsheet of an absorbent article or, when designed to have extensibility, as a pair of wings of an absorbent article. Included in known nonwoven fabrics containing crimped fibers is one that exhibits sufficient recovery from extension in a planar direction and sufficient deformability when compressed in its thickness direction and has a relatively small density and breathability as a whole.

For instance, commonly assigned Japanese patent application JP-A-2002-187228 discloses a nonwoven fabric comprising a first layer and an adjoining second layer made of a material exhibiting elastomeric behavior, preferably crimped fibers. The first and second layers are partly joined at joints arranged in a prescribed pattern. The first layer has a three-dimensional configuration between the joints. The nonwoven fabric as a whole exhibits elastomeric behavior and breathability.

Commonly assigned Japanese patent application JP-A-2004-33236 proposes an absorbent article having a liquid permeable nonwoven fabric between a topsheet and an absorbent member. The nonwoven fabric has a first layer on the absorbent member side and a second layer on the topsheet side that are joined together. The first layer contains helically crimped fibers, and the fibers constituting the first layer are fusion bonded to each other to form a network structure. The fibers of the second layer are taken into the helices of the helically crimped fibers of the first layer so that the capillarity of the nonwoven fabric increases from the second layer toward the first layer.

The above-mentioned nonwoven fabrics exhibit the performance properties required of an absorbent article topsheet, i.e., capillarity, liquid distributing ability, and liquid permeability. The nonwoven fabric disclosed in JP-A-2002-187228 supra additionally exhibits extensibility required of wings or like members of an absorbent article. There still is a demand on the market for an absorbent article, such as a sanitary napkin, that provides more wearing comfort and more manageability in use. An absorbent article that will meet the market needs has been developed extensively. Along this line, a nonwoven fabric has been demanded that provides a good fit and has higher capillarity, liquid distributing ability and liquid permeability so that, when used as a topsheet, a discharged body fluid may quickly migrate to the absorbent member without staying on the surface of the topsheet. Nonwoven fabric for use as, e.g., wings of an absorbent article has been required to have enough extensibility/contractibility to flexibly follow the wearer's bodily movement.

SUMMARY OF THE INVENTION

The present invention provides a nonwoven fabric having a layer containing crimped fibers. In parts of the layer, a plurality of the crimped fibers gather to form a large number of fiber clusters, which are distributed all over the layer.

The present invention also provides a preferred process of producing the nonwoven fabric. The process includes the steps of opening self-crimping fibers on a card to form a carded web and heat-treating the web in a heat shrinking unit at a temperature ranging from a temperature at which the self-crimping fibers start shrinking to 110° C. for 2 to 10 seconds while transferring the web into the heat shrinking unit at an overfeed of 50% to 80% in the machine direction and controlling the shrinkage of the web in the heat shrinking unit such that the width of the web in the direction perpendicular to the machine direction of the web reduces to 50% to 90% of that before shrinkage.

The present invention also provides a preferred process of producing a nonwoven fabric having the above-described layer as a first layer and a second layer of fibers located on one side of the first layer. The two layers are joined together at a large number of discretely arranged joints, and the second layer protrudes between the joints to form many protrusions. The process includes the steps of opening self-crimping fibers on a card to form a carded web and heat-treating the web in a heat shrinking unit at a temperature ranging from a temperature at which the self-crimping fibers start shrinking to 110° C. for 2 to 10 seconds while transferring the web into the heat shrinking unit at an overfeed of 50% to 80% in the machine direction and controlling the shrinkage of the web in the heat shrinking unit such that the width of the web in the direction perpendicular to the machine direction of the web reduces to 50% to 90% of that before shrinkage.

BRIEF DESCRIPTION OF THE DRAWINGS

The present invention will be more particularly described with reference to the accompanying drawings, in which.

DETAILED DESCRIPTION OF THE PREFERRED EMBODIMENTS

A first preferred embodiment of the nonwoven fabric according to the invention will be described by referring to FIGS. 1 through 3.

Figure 1:
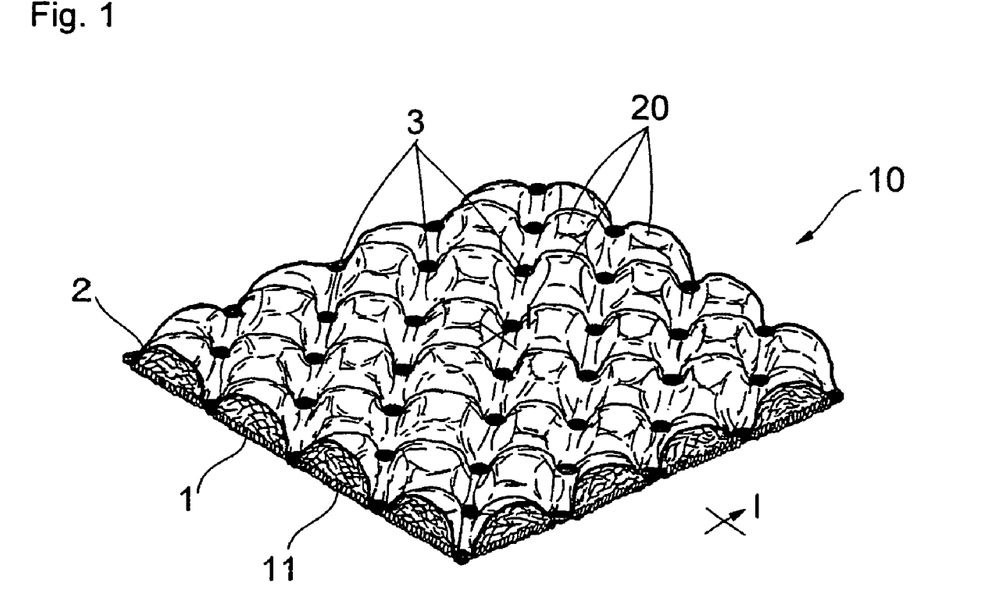
FIG. 1 is a perspective schematically illustrating a first embodiment of the nonwoven fabric according to the present invention.

As illustrated in FIG. 1, the nonwoven fabric 10 of the first embodiment has a first layer 1 and a second layer 2 that is another fiber layer disposed on one side of the first layer 1. The first layer 1 and the second layer 2 are partly joined at a large number of joints 3. In this particular embodiment, the joints 3 are circular and discretely arranged in a staggered pattern. The joints 3 are densified parts thinner and denser than other parts of the nonwoven fabric 10.

Figure 2:
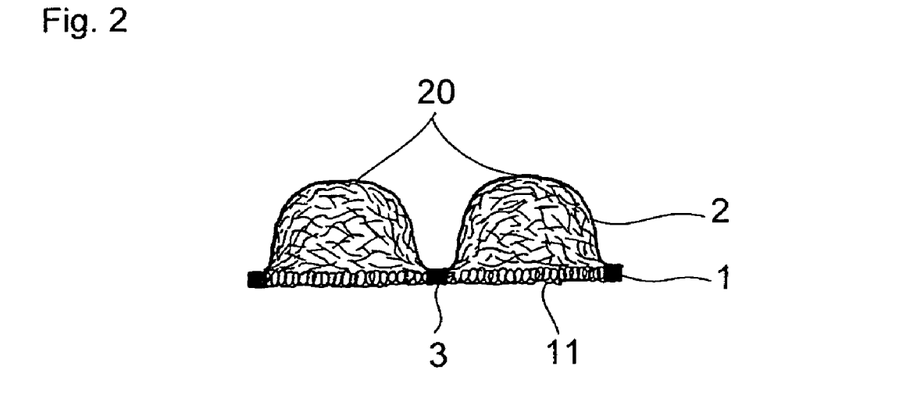
FIG. 2 is an enlarged cross-section taken along line I-I of FIG. 1.

The second layer (another fiber layer) protrudes between the joints 3 to form a large number of protrusions 20 so that the nonwoven fabric 10 has a three-dimensionally textured surface on its second layer side (see FIG. 2). The individual protrusions 20 are dome-shaped and filled with the fibers constituting the second layer 2. On the first layer side, the parts between the joints 3 are substantially flat. That is, the nonwoven fabric 10 has a flat surface on its first layer side and a large number of protrusions 20 on its second layer side.

Thus, the nonwoven fabric 10 of the present embodiment is a bulky nonwoven fabric having protrusions and depressions.

The first layer 1 of the nonwoven fabric 10 of the first embodiment contains crimped fibers 11. As illustrated in FIG. 3, the first layer 1 has four to six crimped fibers 11 gathering in one place to form a fiber cluster 12, and such clusters 12 are distributed all over the first layer 1. The crimped fibers 11 are self-crimping fibers having been crimped through a prescribed heat treatment. In the first layer 1, at least part of self-crimping fibers have been crimped into the crimped fibers 12. The second layer 2 of the nonwoven fabric 10 is made up of fibers containing heat fusible fibers. The crimped fibers 11 of the first layer 1 do not substantially melt at or below the melt initiation temperature of the heat fusible fibers making the second layer 2. Note that FIG. 3 shows only a part of the first layer 1 with the rest omitted.

The individual crimped fibers 11 forming the first layer 1 are helical (coil-shaped). Each cluster 12 is a gathering of four to six crimped fibers entangled with each other in an oblong geometry. Each cluster 12 is a result of self-crimping of a plurality of self-crimping fibers in a place while engulfing and entangling with each other in the step of heat shrinkage treatment. In some cases, four to six self-crimping fibers may self-crimp while entangling with each other into one cluster 12. In other some cases, two or three self-crimping fibers may self-crimp while entangling with each other into a cluster precursor, and two or three cluster precursors then gather while entangling with each other into one cluster 12.

Because the clusters 12 have the fibers 11 entangled with each other with a very short fiber-to-fiber distance, they have high capillarity and exhibit high absorbency when liquid is placed on the surface of the first layer 1. When liquid is placed on the side of the second layer 2, the liquid swiftly migrates to the first layer 1 owing to the higher capillarity of the first layer 1 than that of the second layer 2.

Figure 3:
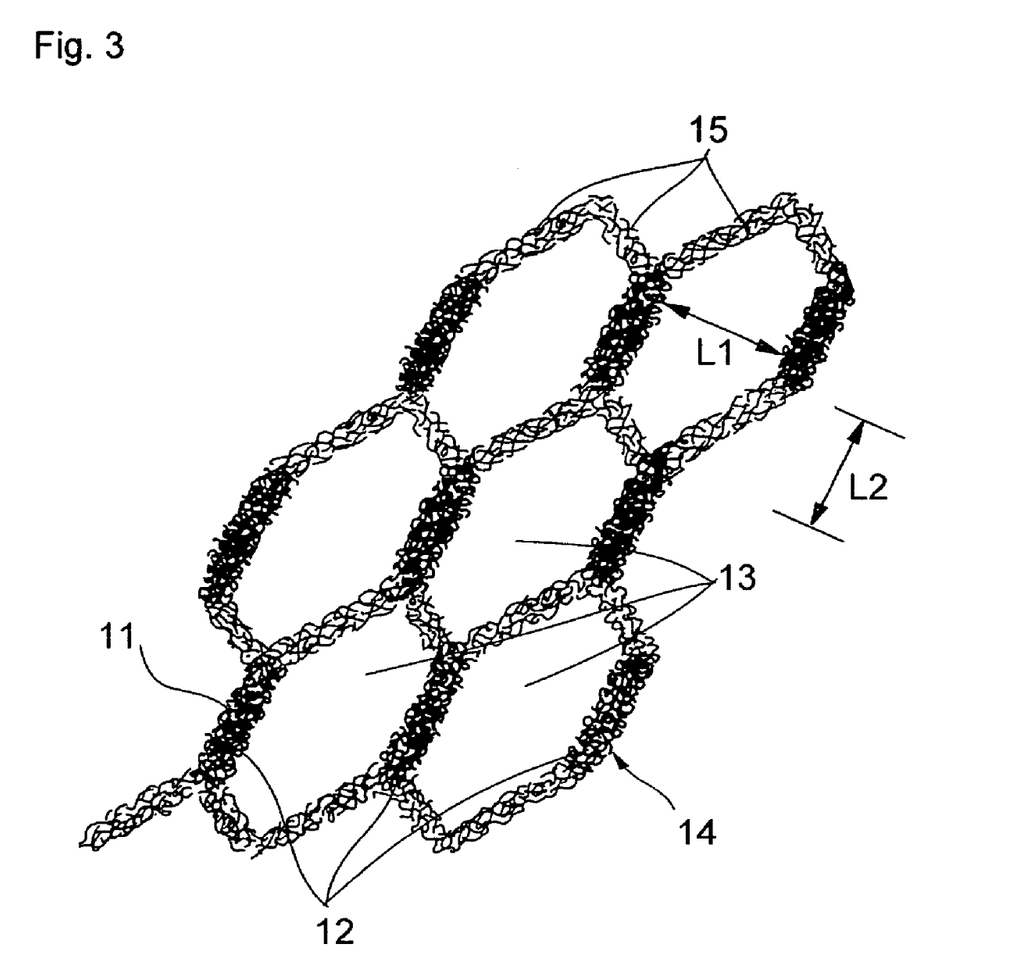
FIG. 3 is an enlarged plan schematically illustrating an essential part of the first layer of the nonwoven fabric according to the first embodiment.

The clusters 12 are arranged in unidirectional orientation as shown in FIG. 3. The self-crimping fibers of which the first layer 1 is to be formed have been oriented in the machine direction (MD) in the step of preparing a first layer-forming fiber aggregate. Upon being subjected to heat shrinkage treatment, the self-crimping fibers are crimped in the manner described while maintaining the orientation. The resultant clusters 12 therefore have an oblong shape and are orientated in the MD as shown in FIG. 3.

The degree of entanglement of the crimped fibers 11 in the clusters 12 tends to be higher when the heat shrinkage treatment is carried out under at least one of the following conditions: (1) the temperature is lower, (2) the treating time is longer, and (3) the tension in the MD of the self-crimping fiber web or the cross direction (the direction perpendicular to the MD, hereinafter "CD") is lower. When the heat shrinking temperature is lower, the fibers are more slowly crimped so that they are more securely entangled with each other without slipping through themselves. When the heat shrinking time is longer, the crimp develops to a higher degree with time. When the tension in the MD or CD is lower, the fibers are less hindered from shrinking, and the crimp develops to a higher degree accordingly. The MD as referred to with respect to the heat shrinkage treatment is the machine direction of the nonwoven fabric 10 in the treatment and can be different from the MD of the first layer-forming fiber aggregate.

More specifically, the heat shrinkage treatment is preferably carried out at 110° C. or lower for 2 to 10 seconds. A composite web of a first layer-forming fiber aggregate and a second layer-forming fiber aggregate is preferably introduced into a heat shrinking unit at an overfeed of 50% to 80%. The shrinkage of the web in the heat shrinking unit is preferably controlled such that the width of the web in the CD reduces to 50% to 90% of that before shrinkage. The details of the process of producing the nonwoven fabric 10 will be described infra.

In the first layer 1 of the nonwoven fabric 10 according to the present embodiment, the clusters 12 connect to each other to form a network structure as illustrated in FIG. 3. One end, e.g., the front end of one oblong cluster 12 connects to the rear end of each of the two nearest oblong clusters 12 via the respective connecting parts 15. The connecting parts 15 are preferably made up of fewer crimped fibers 11 than the clusters 12. The terms "front end" and "rear end" as used herein mean one and the other longitudinal ends of an oblong cluster 12.

The clusters 12 are distributed in a staggered pattern. The front and rear ends of clusters connect to the rear and front ends of the nearest clusters, respectively, to form the mesh of the network structure 14.

Not all the clusters 12 forming the network structure 14 are distributed in the same plane. The positions of the clusters 12 in the thickness direction of the first layer 1 may somewhat vary. The nearest clusters 12 may connect to each other at not only their front and rear ends but other parts.

The individual clusters 12 preferably have a length of 200 to 5000 μm and a width of 30 to 100 μm in their plan view as measured under electron microscopic observation. Each cluster is defined by its lateral sides and longitudinal ends. The side is a border from a fiber-absent or -sparse area, and the end is a border from a less dense area.

In the network structure 14 shown in FIG. 3, the distance L1 between two clusters 12 adjacent in the direction perpendicular to the longitudinal direction of the clusters 12 as measured in the direction perpendicular to the longitudinal direction is preferably 30 to 500 μm in the plan view. The distance L2 between two clusters adjacent in the longitudinal direction (i.e., the distance from the front end of one cluster to the rear end of the other) as measured in the longitudinal direction is preferably 30 to 500 μm in the plan view.

Since the first layer 1 of the nonwoven fabric 10 has such a network structure 14 and thereby exhibits high liquid distribution ability, liquid put on the surface of the first layer 1 is rapidly absorbed by and diffused in the layer. Even when liquid is placed on the side of the second layer 2, it rapidly migrates to the first layer 1 by the capillarity of the first layer 1 and enjoys the same effects.

The nonwoven fabric 10 of the first embodiment having the described structure is excellent in liquid absorption and extensibility/contractibility and suited for use as a member of an absorbent article, a cleaning sheet (wipe), etc. In such applications, the first layer 1 of the nonwoven fabric 10 preferably has a double- or multi-ply structure composed of at least two two-dimensional network structures 14, more preferably a multi-ply structure composed of 4 to 20 two-dimensional network structures 14. In this case, the two or more two-dimensional network structures 14 are connected to each other by the constituent crimped fibers 11 to provide a unitary first layer 1.

As illustrated in FIG. 3, there is a fiber-absent or -sparse area (hereinafter inclusively referred to as a fiber-sparse area) 13 where the crimped fibers 11 are absent or sparse adjacent to the longitudinal ends and lateral sides of each cluster 12. The clusters 12 are each formed by the entanglement of a plurality of self-crimping fibers neighboring mostly in their width direction with each other in a heat shrinkage treatment. It follows that the amount of the fibers by both sides of each cluster 12 is reduced to form the fiber-sparse areas 13. The fiber-sparse area 13 has no crimped fibers 11 or has a smaller fiber density than the clusters 12. The "fiber density" as used herein denotes the number of fibers per unit area.

Thus, the fiber-sparse area 13 is mostly formed on both sides of the clusters 12 as illustrated in FIG. 3. In the first embodiment, the clusters 12 are arranged in a staggered pattern, and a fiber-sparse area 13 is formed in a region surrounded by the clusters 12. The ends of every longitudinally adjacent clusters 12 are connected via the connecting parts 15 to form closed loops of crimped fibers 11. That is, each of the fiber-sparse areas 13 is like a through-hole open on the surface of the first layer 1.

A portion having a crimped fiber density intermediate between that of the clusters 12 and that of the fiber-sparse areas 13 may be present between the network structures 14.

Having such through-holes-like fiber-sparse areas 13, the first layer 1 exhibits high liquid permeability. Liquid placed on the first layer side of the nonwoven fabric 10 quickly passes through the first layer 1. When liquid is placed on the second layer side of the nonwoven fabric 10, it rapidly moves to the first layer 1 by the aforementioned capillarity so that the same effects are obtained.

The first layer 1 having the above-described structure has strong extensibility as well as elasticity owing to the coil configuration of the crimped fibers 11. The strong extensibility is attributed to the clusters 12 in which the self-crimped fibers are entangled, the two-dimensional network structure 14 constructed of the clusters 12, and the unitary stack of the network structures 14. Therefore, the first layer 1 exhibits excellent extensibility/contractibility in the in-plane, two-dimensional directions, particularly in the orientation direction of the clusters 12.

The nonwoven fabric 10 having the thus designed first layer 1 has excellent extensibility/contractibility and absorbency.

The nonwoven fabric 10 of the first embodiment is suited for use as a member of an absorbent article, such as a topsheet or a pair of wings, or of a cleaning sheet (a wipe). For such applications, the weight per unit area of the nonwoven fabric 10 is preferably 10 to 200 g/m$^2$, more preferably 30 to 100 g/m$^2$. The weight per unit area of nonwoven fabric is obtained by weighing a 50 mm by 50 mm cut specimen with an electronic balance having a minimum readability of 1 mg and converting the weight as measured to a per unit area basis.

For the applications described, the nonwoven fabric 10 preferably has an apparent density of 10 to 200 kg/m$^3$ under a load of 0.4 cN/cm$^2$ and of 20 to 400 kg/m$^3$ under a load of 34.2 cN/cm$^2$.

The load of 0.4 cN/cm$^2$ is almost equal to the pressure applied to an absorbent article while worn. The load of 34.2 cN/cm$^2$ is almost equal to the body pressure applied to an absorbent article while worn.

The apparent density of the nonwoven fabric 10 under the load of 0.4 cN/cm$^2$ and 34.2 cN/cm$^2$ is calculated by dividing the weight per unit area by the thickness measured under the respective load.

In terms of bulkiness and compression deformability, the thickness of the nonwoven fabric 10 is preferably 1 to 10 mm, more preferably 2 to 6 mm, under a load of 0.4 cN/cm$^2$ and 0.5 to 5 mm, more preferably 1.5 to 3 mm, under a load of 34.2 cN/cm$^2$, while varying depending on the intended use.

The thickness under a load of 0.4 cN/cm$^2$ is measured, for example, as follows. A 50 mm by 50 mm specimen is cut out of the nonwoven fabric 10. A plate weighing 10 g and larger in size than the specimen is mounted on a measuring stage. The vertical position of the upper surface of the plate is taken as a base point A. The plate is once removed, the specimen is placed on the measuring stage, and the plate is put thereon. The vertical position of the upper surface of the plate is taken as point B. The difference between points A and B is the thickness of the nonwoven fabric 10. Measurement is made with a laser displacement meter (CCD laser displacement sensor LK-080, from Keyence Corp.). A dial gauge type thickness meter will do in place of the laser displacement meter, in which case, however, the measuring force and the weight of the plate should be adjusted to give a load of 0.4 cN/cm$^2$ to the specimen.

The thickness under a load of 34.2 cN/cm$^2$ is measured, for example, as follows using a compression tester KES-FB3 available from Kato Tech Co., Ltd. The KES-FB3 compression tester is designed to give a compression-recovery load to a specimen (e.g., fabric or film) by putting down and then lifting a 2 cm$^2$ disk indenter and to record a load-displacement hysteresis loop for a compression-recovery cycle, from which the thickness of the specimen can be obtained. A 2.5 cm-side square specimen cut out of the nonwoven fabric 10 is set on the receiver of the tester. The indenter is moved down at a speed of 0.02 mm/sec until a load of 49.0 cN/cm$^2$ is applied to the specimen and then moved up until the load to the specimen decreases to 0 cN/cm$^2$, thereby to obtain a load-displacement hysteresis loop for the compression-recovery cycle. The thickness of the specimen at 34.2 cN/cm$^2$ in the loading curve is read. Measurements are made at five positions of the sample to obtain an average, which is taken as thickness T2 of the nonwoven fabric 10.

The nonwoven fabric 10 preferably has a compressive deformation percentage of 30% to 90%, more preferably 50% to 90%, the compressive deformation percentage being calculated from the thickness at 0.4 cN/cm$^2$ (T1) and the thickness at 34.2 cN/cm$^2$ (T2) according to equation (2):

$$\text{Compressive deformation percentage (\%)} = (T1-T2)/T1 \times 100 \qquad (2)$$

The nonwoven fabric 10 having the recited compressive deformation percentage exhibits improved conformability to wearer's body contour or movement and an improved texture when used as a member of an absorbent article.

As stated, the first layer 1 of the nonwoven fabric 10 is made of a material having extensibility and contractibility (elastomeric behavior). When stretched in a planar direction, the first layer generates a prescribed contraction stress. The nonwoven fabric 10 as a whole exhibits elastomeric behavior with extensibility and contractibility. In applications as a member of an absorbent article, for instance, the nonwoven fabric 10 is satisfactorily conformable to the wearer's movement to provide an improved fit and an effective protection against leakage. The second layer 2 is extensible. It does not matter whether the second layer 2 has elastomeric behavior.

In order to display sufficiently high elastomeric behavior, it is preferred for the nonwoven fabric 10 to have a recovery from 50% extension of 50% or more, more preferably 60% or more, even more preferably 60% to 100%. The recovery from extension can vary according to the direction of measurement. Sufficient elastomeric behavior will be exhibited as long as the recovery from extension falls within the above range in at least one of the MD and the CD of the nonwoven fabric 10 (hereinafter the same).

The recovery from extension is measured as follows. Measurement is made with a tensile/compression tester RTA-100 supplied by Toyo Baldwin in the tensile mode. A 50 mm by 50 mm specimen cut out of the nonwoven fabric 10 is set between air chucks of the tester at an initial chuck distance of 30 mm. The chuck attached to the load cell (rated output: 5 kg) is moved upward at a pulling speed of 100 mm/min. When the specimen is 50% extended (by 15 mm), the chuck is moved downward to the original position at a speed of 100 mm/min. The readings of the load cell and the amount of extension of the specimen are plotted. The recovery from extension is obtained from the plots according to equation (3):

$$\text{Recovery from Extension (\%)} = \text{amount of recovery}/\text{maximum amount of extension } (=15 \text{ mm}) \times 100 \quad (3)$$

wherein "amount of recovery" is the distance the chuck travels during unloading until the load cell reading reaches zero.

Both the first layer 1 and the second layer 2 being a fiber aggregate as stated, the nonwoven fabric 10 as a whole has breathability. To secure sufficient breathability, the nonwoven fabric 10 preferably has a Gurley air permeance (JIS P8117) of 2 s/100 ml or less, more preferably 1.5 s/100 ml or less. The lower limit of the Gurley air permeance varies depending on application. For use as a surfacing material or standing side guards of an absorbent article, for instance, a preferred lower limit would be about 0.5 s/100 ml. For the same reason, the breathability of the nonwoven fabric 10 is preferably such that the KES air permeation resistance as measured with an air permeability tester KES-F8 is 4 kPa·s/m or less, more preferably 3 kPa·s/m or less.

The joints 3 are formed by various bonding means, including heat embossing, ultrasonic embossing, and adhesion with an adhesive. The shape of the individual joints 3 is not limited to a circle as in the present embodiment but includes an ellipse, a triangle, a rectangle, and a combination of these shapes. The joints 3 may have a continuous shape, such as lines including straight lines and curved lines.

The total area ratio of the joints 3 to the area of the nonwoven fabric 10 (total area ratio of the joints 3 per unit area of the nonwoven fabric 10) is, while subject to variation according to the use of the nonwoven fabric 10, preferably 3% to 50%, more preferably 5% to 35%, in order to assure bonding between the two fiber layers 1 and 2 while providing sufficient bulk owing to the protrusions formed of the second layer 2.

The fiber of the first fiber-forming fiber aggregate that can be used to make the first layer 1 includes those made of thermoplastic polymers and having heat shrinkability. The fiber after heat shrinkage exhibits elastomeric behavior. Such a fiber includes self-crimping fiber. Self-crimping fiber is handled in the same manner as for common fibers for known nonwoven fabrics before being heated and, upon being heated at a predetermined temperature, shrinks and develops helical crimp. Using self-crimping fiber provides heat shrinkability and elastomeric behavior.

The self-crimping fiber includes conjugate fibers consisting of two thermoplastic polymers having different shrinkage percentages in an eccentric sheath/core configuration or a side-by-side configuration. Examples of such self-crimping conjugate fibers are given in JP-A-9-296325 and Japanese Patent 2759331.

The fiber of the second layer-forming fiber aggregate that can suitably be used to make the second layer 2 includes those made of thermoplastic polymers. The thermoplastic polymers include polyolefins, e.g., polyethylene and polypropylene, polyesters, e.g., polyethylene terephthalate, and polyamide. Sheath/core or side-by-side conjugate fibers composed of two of these thermoplastic polymers are also useful. The fiber to be used to make the second layer 2 has no substantial heat shrinkability or does not substantially shrink at a shrinking temperature of the self-crimping fibers used to make the first layer 1. While depending on the use of the nonwoven fabric 10, a preferred fineness of the fiber of the second layer 2 ranges from 0.5 to 20 dtex, more preferably from 1.0 to 10 dtex, in view of ease of fiber preparation and, for use as a member of an absorbent article, good hand.

The first layer 1 and the second layer 2 can contain other fibers, such as absorbent fibers including rayon, cotton, and hydrophilized acrylic fiber.

The form of the first layer-forming fiber aggregate includes (1) a carded web containing self-crimping fibers, (2) a heat shrinking nonwoven fabric that shrinks on heating at a predetermined temperature, and (3) a heat shrinking net. The heat shrinking nonwoven fabric includes thermally bonded nonwoven, hydroentangled nonwoven, needle-punched nonwoven, solvent-bonded nonwoven, spun-bonded nonwoven, and melt-blown nonwoven.

The form of the second layer-forming fiber aggregate includes a carded web, thermally bonded nonwoven, hydroentangled nonwoven, needle-punched nonwoven, solvent-bonded nonwoven, spun-bonded nonwoven, melt-blown nonwoven, and knitted fabric. Where a carded web is chosen as a second layer-forming fiber aggregate, the resulting nonwoven fabric 10 has bulky protrusions 20 filled with the fibers of the web, with the fibers aligned along the protrusions 20. When in using nonwoven or knitted fabric to form the second layer 2, the resulting nonwoven fabric 10 has hollow, dome-shaped protrusions 20. When using a carded web as a second layer-forming fiber aggregate, in particular, a second layer 2 having an extremely sparse structure is formed, and the resulting nonwoven fabric 10 has permeability to or retentivity for a highly viscous liquid and, in addition, high compressive deformability when compressed in its thickness direction. The highly viscous liquid includes soft stool, menstrual blood, cleansers or moisturizers for human body, and cleansers for non-bodily objects.

The carded web is a fiber aggregate before being converted to nonwoven fabric, i.e., a very loose aggregate of fibers as formed by carding that has not been subjected to a treatment for making nonwovens, such as a heat fusion treatment by through-air bonding or calendering. Where a carded web is used as a second fiber layer-forming fiber aggregate, the fibers of the carded web are bonded to each other by fusion bonding or with a solvent or mechanically entangled with each other either simultaneously with or after joining with a first layer-forming fiber aggregate.

While depending on the use of the nonwoven fabric 10, the first layer-forming fiber aggregate preferably has a weight of 5 to 100 g/m$^2$, more preferably 15 to 50 g/m$^2$, to provide the nonwoven fabric 10 with sufficient bulk and compressive deformability leading to softness. While depending on the use of the nonwoven fabric 10, the second layer-forming fiber aggregate preferably has a weight of 5 to 100 g/m$^2$, more preferably 15 to 50 g/m$^2$, for the same reason as for the first layer-forming fiber aggregate and, in addition, to secure sufficient breathability.

In order to sufficiently form the clusters 12 of crimped fibers thereby to make the network structure 14, it is preferred that the first layer-forming fiber aggregate contain 70% to 100% by weight, more preferably 90% to 100% by weight, of self-crimping fibers. Where the first layer-forming and second layer-forming fiber aggregates are joined by heat fusion bonding, the first layer-forming fiber aggregate may contain heat fusible fibers to ensure the bonding strength. In referring to the weight proportion, the self-crimping fibers and the crimped fibers are not distinguished (hereinafter the same).

Where the first layer-forming and second layer-forming fiber aggregates are joined by heat fusion bonding, it is advantageous for the second layer-forming fiber aggregate to contain heat fusible fibers preferably in an amount of 70% to 100% by weight. Where the two fiber aggregates are joined by other bonding means, such as adhesion with an adhesive, the second layer-forming fiber aggregate does not need to contain heat fusible fibers. The second layer-forming fiber aggregate may contain self-crimping fibers in a small amount, e.g., 5% to 30% by weight.

As described, the nonwoven fabric 10 of the first embodiment exhibits high capillarity. When used as a topsheet of an absorbent article, for example, the nonwoven fabric 10 absorbs a body fluid discharged thereon completely to keep the wearer's skin dry thereby to give a wearer comfort and prevent skin hydration and rash. When used as a member of a cleaning sheet (a wipe), the nonwoven fabric 10 mops up every last drop of liquid on a floor, etc.

The nonwoven fabric 10 also has high liquid distributing ability as well as capillarity. Therefore, it is suited for use as a topsheet of an absorbent article or a member of a cleaning sheet.

The first layer 1 of the nonwoven fabric 10 has high liquid permeability. Therefore, when used as a topsheet of an absorbent article, the nonwoven fabric 10 makes a body fluid discharged thereon swiftly pass therethrough.

The nonwoven fabric 10 also has strong extensibility and contractibility. Therefore, when used as a topsheet of an absorbent article, it flexibly follows the wearer's movement to provide a snug fit and a superior leakage protection. When it is used as wings of a sanitary napkin, the sanitary napkin is easy to attach to underwear and comfortable to wear.

The second layer of the nonwoven fabric 10 according to the first embodiment has a great number of three-dimensional protrusions 20 and provides excellent cushion and a nice feel to the touch. Therefore, when used as a topsheet of an absorbent article, the nonwoven fabric 10 provides utmost comfort to wear causing no skin hydration or rash. When used as a member of a cleaning sheet, the nonwoven fabric 10 catches up dirt and debris between the protrusions 20 to show excellent cleaning performance.

A nonwoven fabric according to a second embodiment of the present invention is then described with reference to FIG. 4. The description on the first embodiment applies to the second embodiment unless otherwise specified. Elements identical with the same numerals as in FIGS. 1 to 3 are identical and will not be redundantly described.

Figure 4:
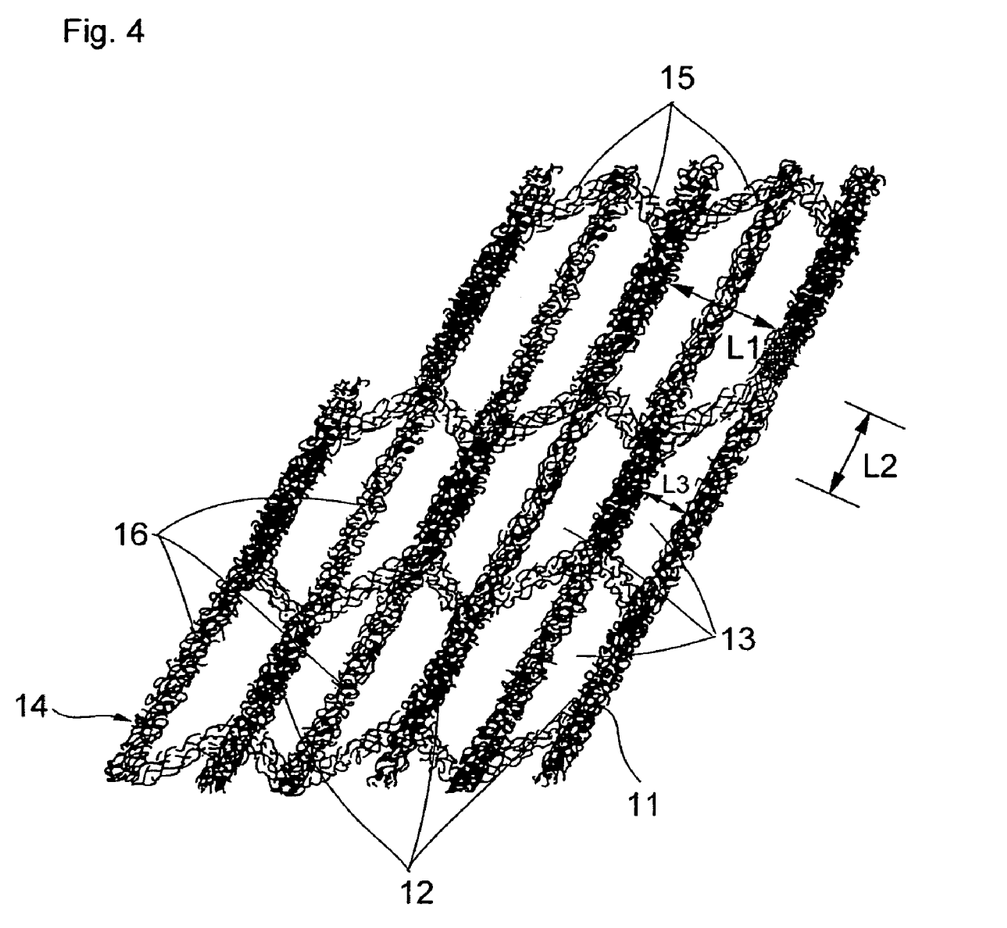
FIG. 4 is an enlarged plan schematically illustrating an essential part of the first layer of the nonwoven fabric according to a second embodiment.

As illustrated in FIG. 4, the first layer 1 of the nonwoven fabric 10 of the second embodiment has clusters 12 formed by entanglement of seven to ten crimped fibers 11 per cluster. Additionally, the first layer 1 has secondary clusters 16 of the crimped fibers 11. Each of the secondary clusters 16 is preferably formed through entanglement of three to five crimped fibers 11.

The fiber-sparse areas 13 where the crimped fibers 11 are scarce have a smaller fiber density than those in the first embodiment. The connecting parts 15 interconnecting the clusters 12 to form the two-dimensional network structure 14 have a smaller density of crimped fibers 11 than those in the first embodiment.

The first layer 1 and the second layer 2 are the same as those in the first embodiment in kind of constituent fibers and weight per unit area. The only difference from the first embodiment resides in the conditions of heat shrinkage treatment. More specifically, the heat shrinkage treatment to obtain the nonwoven fabric 10 of the second embodiment is preferably carried out at 108° C. or lower for 5 to 20 seconds while transferring the composite web into the heat shrinking unit at an overfeed of 40% to 70% and controlling the shrinkage of the web in the heat shrinking unit such that the width of the web in the CD reduces to 40% to 80% of that before shrinkage. The details of the process of producing the nonwoven fabric according to the present invention will be described later.

In the nonwoven fabric 10 of the second embodiment obtained by the heat shrinkage treatment under the above-described conditions, the clusters 12 are formed out of more fibers than the clusters 12 of the first embodiment because the crimp development (shrinkage) has been milder and slower than in the first embodiment and also because the MD and CD tensions during crimp development are weaker than those in the first embodiment.

In the network structure 14 illustrated in FIG. 4, the distance L1 between two clusters 12 adjacent in the direction perpendicular to the longitudinal direction of the clusters 12 as measured in the direction perpendicular to the longitudinal direction is preferably 30 to 500 μm in the plan view. The distance L2 between two clusters 12 adjacent in the longitudinal direction as measured in the longitudinal direction is preferably 30 to 500 μm in the plan view.

Each of the secondary clusters 16 is formed in an area surrounded by the nearest four clusters 12 making the least unit of a staggered pattern. By the above-mentioned alteration of heat shrinkage conditions, the self-crimping fibers are crimped more easily so that the self-crimping fibers present in the middle of the area surrounded by the nearest four clusters 12 also gather while entangling with each other to form the secondary cluster 16. The secondary clusters 16 are oblong and aligned in the same direction as the clusters 12. The front end of a secondary cluster 16 connects to the rear end of a cluster 12 adjacent in the longitudinal direction, and the rear end of the secondary cluster 16 connects to the front end of another cluster 12 adjacent in the longitudinal direction. That is, the secondary clusters 16 also constitute part of the two-dimensional network structure 14.

The individual secondary clusters 16 preferably have a length of 200 to 5000 μm and a width of 30 to 100 μm in their plan view as measured under electron microscopic observation. The sides and ends of each secondary cluster 16 are delineated in the same manner as for the cluster 12.

In the network structure 14 shown in FIG. 4, the distance L3 between a secondary cluster 16 and each of the two clusters 12 adjacent in the direction perpendicular to the longitudinal direction as measured in the direction perpendicular to the longitudinal direction is preferably 30 to 500 μm.

Part of the fibers that would form the connecting parts 15 in the first embodiment are used to form the clusters 12 and the secondary clusters 16. As a result, the number of the crimped fibers 11 forming the connecting parts 15 is fewer than in the first embodiment.

From the perspectives described above, it is preferred that the nonwoven fabric 10 of the second embodiment have the following physical properties. The methods of measurements are as described supra.

The weight is preferably 10 to 200 g/m$^2$, more preferably 30 to 100 g/m$^2$.

The apparent density under a load of 0.4 cN/cm$^2$ is preferably 10 to 200 kg/m$^3$, and that under a load of 34.2 cN/cm$^2$ is preferably 20 to 400 kg/m$^2$.

The thickness under a load of 0.4 cN/cm$^2$ is preferably 1.5 to 10 mm, more preferably 2 to 6 mm, and that under a load of 34.2 cN/cm$^2$ is preferably 1 to 5 mm, more preferably 1.5 to 3 mm.

The compressive deformation percentage is preferably 30% to 85%, more preferably 40% to 70%.

The recovery from 50% extension is preferably 50% or more, more preferably 60% or more, even more preferably 60% to 90%.

The Gurley air permeance (JIS P8117) is preferably 5 s/100 ml or less, more preferably 1 s/100 ml or less. For use as a topsheet or standing side guards of an absorbent article, for instance, a preferred lower limit of the Gurley air permeance would be about 0.5 s/100 ml. For the same reason, the KES air permeation resistance as measured with an air permeability tester KES-F8 is 4 kPa·s/m or less, more preferably 3 kPa·s/m or less.

According to the second embodiment, the increased number of the crimped fibers that form the clusters 12 and the presence of the secondary clusters 16 bring about further ensured capillarity, liquid distributing ability, and extensibility/contractibility.

The nonwoven fabric 10 of the second embodiment is particularly suitable as wings or an absorbent member of an absorbent article.

A process of producing a nonwoven fabric according to the present invention will then be described with reference to preferred embodiments of a process of producing the aforementioned nonwoven fabrics.

In a first embodiment of the process according to the invention, the nonwoven fabric 10 of the invention that is composed of the first layer 1 and the second layer 2 is produced as follows. Self-crimping fibers are opened on a card to form a carded web of continuous length, which is used as a first layer-forming fiber aggregate. A second layer-forming fiber aggregate separately fabricated of fibers containing heat fusible fibers is superposed on the first layer-forming fiber aggregate. The two fiber aggregates are partly joining at a large number of joints 3 arranged in a prescribed pattern to form a composite web. The bonding means for joining the two layers includes heat embossing, ultrasonic embossing, and adhesion with an adhesive. A preferred shape of the individual joints 3 includes an ellipse, a triangle, a rectangle, and a combination thereof.

The composite web is transferred into a heat shrinking unit with an overfeed of 50% to 80%, preferably 60% to 75%, in the MD. The shrinkage of the composite web in the heat shrinking unit is controlled such that the width of the web in the direction perpendicular to the MD reduces to 50% to 90%, preferably 80% to 90%, of that before shrinkage. The heating temperature in the heat shrinking unit ranges from a temperature at which the self-crimping fibers start shrinking (hereinafter referred to as shrink initiation temperature) to 110° C., preferably 108° C. or lower. The heat treating time is 2 to 10 seconds, preferably 4 to 8 seconds. The composite web thus shrinks to become the nonwoven fabric of the present invention.

The terminology "overfeed" as used herein means that the composite web on a conveyor is fed to the heat shrinking unit in excess by increasing the feed rate of the composite web over the moving speed of the conveyor at the inlet of the heat shrinking unit. With such an overfeed, the composite web can sag at the inlet of the heat shrinking unit.

As the self-crimping fibers of the first layer-forming fiber aggregate shrink in the heat shrinking unit, the second layer-forming fiber aggregate protrudes between the joints 3 to make protrusions 20.

Where the heat shrinkage is caused by hot air application, it is advisable to minimize the frictional force to the composite web. This can be done by, for example, conveying the composite web on a net and blowing hot air from the lower side of the net to reduce the pressure of the composite web onto the net to zero or negative pressure. Otherwise, the composite web may be fixed on a pin tenter frame or a clip tenter frame so that the composite web may be clear of a conveyor. Where the composite web is placed on a net and conveyed, the MD and CD shrinkages can be controlled by adjusting the ratio of the feed of the composite web to the moving speed of the net (i.e., an overfeed) and by controlling the temperature and air flow rate of the heat shrinkage unit.

Where a tenter is used, the MD and CD shrinkages can be controlled by adjusting the overfeed and by setting the width of the tenter frame at an intended width. In the latter case, the temperature and air flow rate of the heat shrinkage unit are adjusted as appropriate.

In more detail, the shrinkage can be controlled as follows when, for instance, a pin tenter is used. The pin tenter has a pair of chains both running in the same direction as the conveying direction of the composite web. The chains have a number of standing pins on which the edges of the composite web are to be caught by means of a pinning roll at the inlet of the pin tenter. The inside of the pin tenter is heated with hot air at a predetermined temperature, through which the composite web is to be passed at a prescribed speed. The revolving speed of the pinning roll is increased by the MD shrinkage allowance so that the composite web is caught by the pins in excess by the shrinkage allowance. For example, when a composite web whose MD size is taken as 100 is to be shrunken to an MD size 80, and the speed of the pinning roll is taken as 100, the moving speed of the pins is set at 80. In this case, the MD shrinkage is defined to be 80%, and the overfeed is defined to be 80%. On the other hand, shrinkage in the CD is controlled by gradually decreasing the distance between the pair of chains toward the running direction of the composite web. For example, when a composite web whose original width is taken as 100 is to be shrunken to a width 80, and the chain distance at the inlet of the pin tenter is taken as 100, the chain distance at the outlet is set at 80. In this example, the CD shrinkage is 80%.

By the above process, nonwoven fabrics 10 according to the aforementioned first and second embodiments are produced. The degree of crimping of the fibers in the clusters 12 in the nonwoven fabric 10 can be adjusted as desired by controlling the heat shrinking temperature, heat shrinking time, the MD and CD shrinkages, and the like.

In a second embodiment of the process according to the invention, a nonwoven fiber of the present invention which is composed solely of the first layer 1 of crimped fibers 11 is produced as follows.

Crimped fibers are opened on a card to form a carded web of continuous length. The carded web is transferred into a heat shrinking unit at an overfeed of 50% to 80% in the MD, where it is heat-treated at a temperature ranging from a temperature at which the self-crimping fibers start shrinking to 110° C. for 2 to 10 seconds while controlling the shrinkage of the web such that the width of the web in the direction perpendicular to the MD of the web reduces to 50% to 90% of that before shrinkage.

The process of the second embodiment is the same as the process of the first embodiment, except that the second layer-forming fiber aggregate is not used.

The present invention is not limited to the above-described embodiments, and various changes and modifications can be made thereto without departing from the spirit and scope thereof as exemplified as follows.

If desired, either the first layer 1 or the second layer 2 may have a large number of perforations to provide a nonwoven fabric that has improved permeability to body fluids, such as urine, blood, and feces, and reduces skin hydration and rash when used as a surfacing material of an absorbent article. Both the first layer 1 and the second layer 2 may have perforations. In this case, the perforations may be through-holes piercing the two layers, or the positions of the perforations of the two layers may differ.

The individual perforations preferably have a diameter of 0.2 to 5 mm to secure both liquid permeability and a good hand. The perforations are preferably distributed evenly all over the nonwoven fabric 10. The distance between the perforations is preferably 0.5 to 20 mm in view of liquid permeability and a good hand.

The nonwoven fabric of the present invention is suited for use as a member of disposable articles that are disposed of after a single use or a few uses. For example, it is suitable as a member of disposable absorbent articles, such as sanitary napkins and disposable diapers, and disposable cleaning sheets, such as wipes for cleaning non-bodily objects and facial or body wipes. For applications to a disposable absorbent article having a liquid permeable topsheet, a liquid impermeable backsheet, and an absorbent member intermediate between the two sheets, it is used as a part of a member constituting the article, such as the topsheet, the absorbent member, the backsheet or a pair of standing side guards. It is also suited as an extensible member of a pair of wings of a sanitary napkin or an extensible member of a disposable diaper.

The present invention will now be illustrated in greater detail with reference to Examples, but it should be understood that the invention is not deemed to be limited thereto.

Example 1

(1) Preparation of First Layer-Forming Web

Self-crimping fiber which was sheath/core conjugate fiber composed of polypropylene as a core and polyethylene as a sheath (core/sheath mass ratio: 7/3; fineness: 2.2 dtex; fiber length: 51 mm; shrink initiation temperature: 70° C.) was carded on a card to form a carded web weighing 22 g/m².

(2) Preparation of Second Layer-Forming Web

Heat fusible fiber (heat non-shrinkable) which was sheath/core conjugate fiber composed of polyethylene terephthalate as a core and polyethylene as a sheath (core/sheath mass ratio: 7/3; fineness: 2.4 dtex; fiber length: 51 mm) was carded on a card to form a carded web. The web was heat treated at 132° to 140° C. by a through-air process to obtain a nonwoven fabric weighing 22 g/m².

(3) Preparation of Nonwoven Fabric

The nonwoven fabric prepared in (2) above and the carded web prepared in (1) were superposed on each other and joined by heat embossing at 125° C. to obtain a composite web. The embossing pattern was a pattern of circular dots (3.1 mm² each) in a staggered array. The pitches of the dots in the MD and the CD are both 7 mm. The distance of adjacent dots in an orthogonal direction was 5 mm. The embossed area ratio was 13%.

The composite web was treated with hot air in a pin tenter type heat shrinking unit under the conditions below to cause the first layer-forming web to shrink thereby to obtain a nonwoven fabric.
MD Shrinkage (=overfeed): 70%
CD Shrinkage (width of tenter frame): 85%
Shrinking temperature (measured temperature of hot air, hereinafter the same): 108° C.
Shrinking time: 4 seconds Example 2

A nonwoven fabric was obtained in the same manner as in Example 1, except for changing the heat shrinkage treating conditions as follows.

MD Shrinkage (=overfeed): 70%
CD Shrinkage (width of tenter frame): 85%
Shrinking temperature: 105° C.
Shrinking time: 6 seconds Example 3

A nonwoven fabric was obtained in the same manner as in Example 1, except for changing the heat shrinkage treating conditions as follows.
MD Shrinkage (=overfeed): 60%
CD Shrinkage (width of tenter frame): 75%
Shrinking temperature: 100° C.
Shrinking time: 10 seconds Example 4

A nonwoven fabric was obtained in the same manner as in Example 1, except for using a carded web prepared as described below as a first layer-forming web and changing the heat shrinkage treating conditions as described below.

Self-crimping fiber which was sheath/core conjugate fiber composed of polypropylene as a core and polyethylene-polypropylene copolymer as a sheath (core/sheath weight ratio: 7/3; fineness: 2.2 dtex; fiber length: 51 mm; shrink initiation temperature: 75° C.) was carded on a card to form a first layer-forming web weighing 22 g/m².
MD Shrinkage (=overfeed): 50%
CD Shrinkage (width of tenter frame): 75%
Shrinking temperature: 110° C.
Shrinking time: 8 seconds Comparative Example 1

A nonwoven fabric was obtained in the same manner as in Example 1, except for changing the heat shrinkage treating conditions as follows.
MD Shrinkage (=overfeed): 70%
CD Shrinkage (width of tenter frame): 85%
Shrinking temperature: 120° C.
Shrinking time: 4 seconds Performance Evaluation The nonwoven fabrics obtained in Examples 1 to 4 and Comparative Example 1 were evaluated for absorbency in accordance with the following test method. The results obtained are shown in Table 1 below.

Method of Evaluation of Absorbency

The nonwoven fabric was placed on an absorbent member weighing 200 g/m² facing the first layer with the absorbent member and 3 g of defibrinated horse blood was dropped on the second layer of the nonwoven fabric in five seconds. Sixty seconds after the dropping, the weight of the defibrinated horse blood remaining in the nonwoven fabric was measured, from which the absorbency of the nonwoven fabric was evaluated on A to C scale:

A: The weight of the residual defibrinated horse blood is less than 100 mg.
B: The weight of the residual defibrinated horse blood is 100 mg or more and less than 200 mg.
C: The weight of the residual defibrinated horse blood is 200 mg or more.

TABLE 1

|  | Absorbency |
|---|---|
| Example 1 | B |
| Example 2 | B |
| Example 3 | A |
| Example 4 | A |
| Compara. Example 1 | C |

As is apparent from Table 1, the nonwoven fabrics of Examples prove superior in absorbency to the nonwoven fabric of Comparative Example 1.

As described, the nonwoven fabric according to the present invention exhibits excellent extensibility and contractibility as well as high capillarity, liquid distribution ability, and liquid permeability.

What is claimed is:

1. A nonwoven fabric comprising a first layer containing self-crimping fibers and a second layer containing heat fusible fibers, wherein the self-crimping fibers gather in parts of the first layer to form a large number of fiber clusters, the clusters being distributed all over the first layer in a staggered pattern and each cluster has a length of 200 to 5,000 μm and a width of 30 to 100 μm in a plan view,
   wherein the clusters interconnect with each other to form a network structure in the first layer,
   wherein the nonwoven fabric is produced by forming the first layer by opening the self-crimping fibers on a card to form a carded web, superposing the first layer and the second layer, heat-embossing the first layer and second layer to produce a composite web, and heat-treating the composite web thereby shrinking the first layer and forming protrusions in the second layer,
   wherein the heat-treating is performed in a heat shrinking unit at a temperature ranging from a temperature at which the self-crimping fibers start shrinking to 110° C. for 2 to 10 seconds while transferring the composite web into the heat shrinking unit at an overfeed of 50% to 80% in the machine direction and controlling the shrinkage of the composite web in the heat shrinking unit such that the width of the composite web in the direction perpendicular to the machine direction of the composite web reduces to 50% to 90% of that before shrinkage, and
   wherein the self-crimping fibers comprise a polypropylene core and a polyethylene sheath and the self-crimping fibers are coil-shaped after the composite web is heat-treated and the self-crimping fibers shrink, and each cluster is a gathering of self-crimping fibers entangled with each other in an oblong geometry.

2. The nonwoven fabric according to claim 1, wherein the individual clusters are oblong, and the front end of any one of the clusters connects to the rear end of another one of the clusters adjacent to the any one of the clusters in the longitudinal direction of these clusters via a connecting part made of a fewer fibers of the self-crimping fibers than the clusters.

3. The nonwoven fabric according to claim 2, wherein the clusters are unidirectionally oriented.

4. The nonwoven fabric of claim 1, wherein the clusters are oriented in the machine direction.

5. The nonwoven fabric of claim 1, wherein the nonwoven fabric has a double-ply or multi-ply structure comprising at least two layers comprising clusters of self-crimping fibers, and wherein the layers are connected to each other by the self-crimping fibers.

6. A topsheet for an absorbent article comprising the nonwoven fabric of claim 1, wherein the topsheet is applied to an absorbent member with the first layer facing the absorbent member.

* * * * *